US012538186B1

(12) United States Patent
Liang et al.

(10) Patent No.: US 12,538,186 B1
(45) Date of Patent: Jan. 27, 2026

(54) MULTICAST AND BROADCAST SERVICE CONTINUITY DURING MOBILITY

(71) Applicant: ZTE Corporation, Guangdong (CN)

(72) Inventors: Shuang Liang, Shenzhen (CN); Zhendong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 550 days.

(21) Appl. No.: 17/962,374

(22) Filed: Oct. 7, 2022

Related U.S. Application Data

(63) Continuation of application No. PCT/CN2020/083641, filed on Apr. 8, 2020.

(51) Int. Cl.
*H04W 36/00* (2009.01)

(52) U.S. Cl.
CPC .............. *H04W 36/0007* (2018.08)

(58) Field of Classification Search
CPC ............... H04L 43/026; H04L 43/028; H04L 12/185; H04L 12/189; H04L 47/41; H04L 43/08; H04L 47/24; H04L 12/1877; Y02D 30/50; H04W 36/0007; H04W 72/30; H04W 36/0072
USPC ................. 370/328, 329, 330, 312
See application file for complete search history.

(56) References Cited

U.S. PATENT DOCUMENTS

| 2010/0260089 | A1 | 10/2010 | Lin et al. |
| 2013/0315125 | A1 | 11/2013 | Ravishankar et al. |
| 2019/0141586 | A1 | 5/2019 | Olsson et al. |
| 2019/0268815 | A1 | 8/2019 | Zhu et al. |
| 2019/0349803 | A1* | 11/2019 | Byun ............... H04W 28/16 |
| 2019/0357093 | A1* | 11/2019 | Xu ................. H04W 36/0044 |
| 2019/0373543 | A1 | 12/2019 | Zeng et al. |
| 2020/0092685 | A1 | 3/2020 | Fehrenbach et al. |
| 2020/0267513 | A1 | 8/2020 | Zhu et al. |
| 2021/0105196 | A1* | 4/2021 | Dao ............... H04L 43/026 |

(Continued)

FOREIGN PATENT DOCUMENTS

| CN | 101087249 A | 12/2007 |
| CN | 101090525 A | 12/2007 |
| CN | 101232387 A | 7/2008 |

(Continued)

OTHER PUBLICATIONS

Samsung, "MBS service initiation procedure," SA WG2 Meeting #136-AH, Incheon, South Korea, S2-2001708, 3 pages, Jan. 13-17, 2020.

(Continued)

*Primary Examiner* — David Q Nguyen
(74) *Attorney, Agent, or Firm* — Perkins Coie LLP

(57) ABSTRACT

Methods, apparatus, and systems for providing multicast handover are disclosed. In one example aspect, the method includes receiving, by a target radio access node (T-RAN) from a source radio access node (S-RAN) or from an access and mobility management function (AMF), a handover request including a multicast or broadcast context for a handover of a multicast and broadcast service (MBS) to the T-RAN. The method further includes binding a shared tunnel for the MBS and a flow in a unicast protocol data unit (PDU) session in a case that an MBS session identified in the multicast or broadcast context has already been established at the T-RAN, and sending, to an AMF, a message including a handover request acknowledgment or a path switch.

18 Claims, 10 Drawing Sheets

(56) References Cited

U.S. PATENT DOCUMENTS

2021/0258918 A1\* 8/2021 Hong ................ H04W 36/0007

FOREIGN PATENT DOCUMENTS

| CN | 107155187 | A | 9/2017 |
|----|-----------|---|--------|
| CN | 109769150 | A | 5/2019 |
| CN | 110945936 | A | 3/2020 |
| EP | 2200367 | A1 | 6/2010 |
| EP | 3416429 | A1 | 12/2018 |
| EP | 3866508 | A1 | 8/2021 |
| EP | 4090039 | A1 | 11/2022 |
| EP | 4099760 | A1 | 12/2022 |
| EP | 4132093 | A1 | 2/2023 |
| KR | 20110065274 | A | 6/2011 |
| KR | 20120066161 | A | 6/2012 |
| WO | 2012095163 | A1 | 7/2012 |
| WO | 2014/146618 | A1 | 9/2014 |
| WO | 2018202798 | A1 | 11/2018 |
| WO | 2019/091456 | A1 | 5/2019 |
| WO | 2019226111 | A1 | 11/2019 |
| WO | 2020/001572 | A1 | 1/2020 |

OTHER PUBLICATIONS

Huawei et al., "Scope alignment to SA#86 outcome," SA WG2 Meeting #136-AH, Incheon, South Korea, S2-2001700, 3 pages, Jan. 13-17, 2020.

International Search Report and Written Opinion for International Application No. PCT/CN2020/083641, mailed on Dec. 30, 2020, 7 pages.

First Examination Report for Indian Patent Application No. 202247056655, mailed Dec. 19, 2022 (6 pages).

Extended European Search Report for European Patent Application No. 20889096.2, mailed Jul. 7, 2023 (14 pages).

CATT, "Clarification on MBMS service continuity," 3GPP TSG RAN WG2 Meeting #73bis, R2-111843, Shanghai, China, Apr. 11-15, 2011 (3 pages).

CNIPA, Notification to Complete Formalities of Registration for Chinese Application No. 202080099526.3, mailed on Oct. 16, 2024, 8 pages with unofficial English translation.

Qualcomm Incorporated, "Solution: Integrated MBS and Unicast Transport with Full Separation of MBS Service," SA WG2 Meeting #136, S2-1911371, Reno, USA, Nov. 18-22, 2019, 6 pages.

KR: Notice of Allowance issued on Apr. 3, 2025 with English Translation, 1 page.

\* cited by examiner

700

Receiving, by a target radio access node (T-RAN) from a source radio access node (S-RAN) or from an access and mobility management function (AMF), a handover request including a multicast or broadcast context for a handover of a multicast and broadcast service (MBS) to the T-RAN ~710

Binding a shared tunnel for the MBS and a flow in a unicast protocol data unit (PDU) session in a case that an MBS session identified in the multicast or broadcast context has already been established at the T-RAN ~720

Sending, to an AMF, a message comprising a handover request acknowledgment or a path switch ~730

Receiving, by a target radio access node (T-RAN) from a source radio access node (S-RAN) or from an access and mobility management function (AMF), a handover request including a multicast or broadcast context for the handover of a multicast and broadcast service (MBS) to the T-RAN ⏤810

Checking an establishment of the MBS at the T-RAN, wherein in a case that the MBS has not been established, allocating, by the T-RAN, the shared tunnel for the MBS, and in another case that the MBS has already been established at the T-RAN, binding a shared tunnel for the MBS and a flow in a unicast protocol data unit (PDU) session ⏤820

FIG. 8

MULTICAST AND BROADCAST SERVICE CONTINUITY DURING MOBILITY

CROSS REFERENCE TO RELATED APPLICATIONS

This patent document is a continuation of and claims benefit of priority to International Patent Application No. PCT/CN2020/083641, filed on Apr. 8, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that enable handover of multicast data streams in different scenarios. The disclosed techniques can be used to manage multicast sessions when a user equipment (UE) is handed over form one radio access node to another.

In one aspect, the method includes receiving, by a target radio access node (T-RAN) from a source radio access node (S-RAN) or from an access and mobility management function (AMF), a handover request including a multicast or broadcast context for a handover of a multicast and broadcast service (MBS) to the T-RAN. The method further includes binding a shared tunnel for the MBS and a flow in a unicast protocol data unit (PDU) session in a case that an MBS session identified in the multicast or broadcast context has already been established at the T-RAN, and sending, to an AMF, a message including a handover request acknowledgment or a path switch.

In another aspect another wireless communication method is disclosed. The method includes receiving, by a target radio access node (T-RAN) from a source radio access node (S-RAN) or from an access and mobility management function (AMF), a handover request including a multicast or broadcast context for the handover of a multicast and broadcast service (MBS) to the T-RAN. The method further includes checking an establishment of the MBS at the T-RAN, wherein in a case that the MBS has not been established, allocating, by the T-RAN, the shared tunnel for the MBS, and in another case that the MBS has already been established at the T-RAN, binding a shared tunnel for the MBS and a flow in a unicast protocol data unit (PDU) session.

These, and other, aspects are described in the present document.

BRIEF DESCRIPTION OF DRAWINGS

FIG. 7 depicts a process for wireless communication, in accordance with some example embodiments.

FIG. 8 depicts another process for wireless communication, in accordance with some example embodiments.

DETAILED DESCRIPTION

Certain features are described using the example of Fifth Generation (5G) wireless protocol. However, applicability of the disclosed techniques is not limited to only 5G wireless systems.

5G systems (5GS) include multicast/broadcast services. An aspect of these services is multi-cast discovery and the starting and ending of multicast services. User equipment (UEs) may simultaneously operate using unicast (also referred to as unicast) and multicast services. When a UE moves from one radio access network (RAN) node to another RAN node, service continuity of the broadcast and multicast services is needed. Disclosed herein are techniques for providing continuity of service for broadcast and multicast services.

In some example embodiments, a multicast service is a communications service in which the same service and the same content data are provided simultaneously to a set of authorized UEs (i.e., not all UEs in the multicast coverage are authorized to receive the data). A broadcast service is a communications service in which the same service and the same content data are provided simultaneously to all UEs in a geographical area (i.e., all UEs in the broadcast coverage area are authorized to receive the data).

Figure 1:
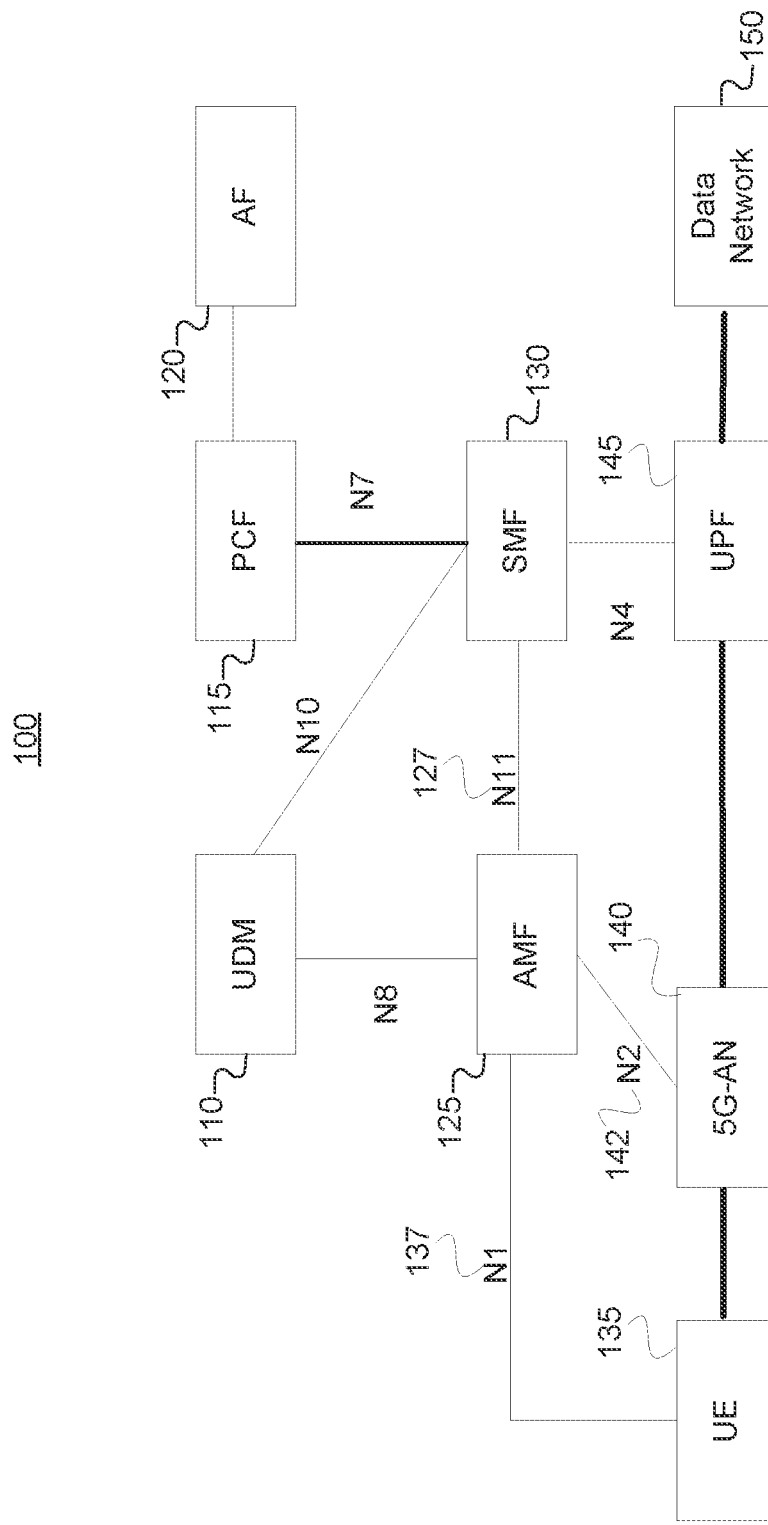
FIG. 1 depicts an architecture for a 5G system, in accordance with some example embodiments.

FIG. 1 depicts an example architecture 100 for a 5G system. The 5G System architecture consists of the network functions (NF) as well as other functions described below.

The access and mobility management function (AMF) 125 performs functions including UE mobility management, reachability management, connection management, and other functions. The AMF terminates the radio access network control plane (RAN CP) interface (also referred to as N2 interface 142) and non-access stratum (NAS) (also referred to as N1 interface 137), NAS ciphering and integrity protection. The AMF also distributes the session management (SM) NAS to the proper session management functions (SMFs) via the N11 interface 127.

The session management function (SMF) 130 includes user equipment (UE) internet protocol (IP) address allocation and management, selection and control of an UP function, PDU connection management, etc.

The user plane function (UPF) 145 is an anchor point for intra-/inter-radio access technology (RAT) mobility and the external protocol data unit (PDU) session point of interconnect to a data network. The UPF also routes and forwards data packets as indicated by the SMF, and the UPF buffers the downlink (DL) data when the UE is in idle mode.

The unified data management (UDM) 110 manages the subscription profiles for the UEs. The subscription includes the data used for mobility management (e.g., restricted area), session management (e.g., quality of service (QOS) profile per slice per data network name (DNN)). The subscription data also includes slice selection parameters which are used by the AMF to select an SMF. The AMF and SMF get the subscription from the UDM and the subscription data is stored in the unified data repository (UDR). The UDM uses the data upon receipt of a request from the AMF or SMF.

The policy control function (PCF) 115 governs network behavior based on the subscription and indication from the application function (AF) 120. The PCF provides policy rules to be enforced by the control plane (CP) functions such as the AMF and/or SMF. The PCF accesses the UDR to retrieve policy data.

A network exposure function (NEF) (not shown) may be included in the system for exchanging information between 5GC and an external third party. For example, the AF 120 may store the application information in the UDR via the NEF.

Multicast/broadcast multimedia subsystem (MBMS) was developed for video broadcasting and streaming services. Since its initial development, the MBMS system has been updated to support new services such as public safety, consumer internet of things (CIoT) and vehicle to everything (V2X). With the development and maturity of 5GS, 5GS is may provide multicast-broadcast services for vertical businesses.

Figure 2:
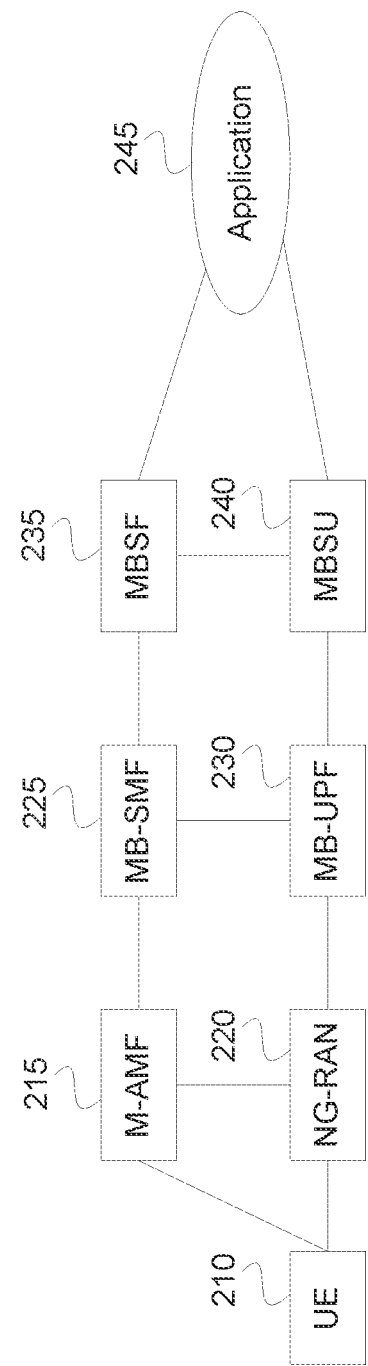
FIG. 2 depicts an enhanced 5G system architecture to provide broadcast/multicast services to a user equipment, in accordance with some example embodiments.

FIG. 2 depicts an example of an enhanced 5G system architecture 200 to provide broadcast/multicast services to a user equipment 230.

The multicast/broadcast service function (MBSF) 235 is a network function (NF) to handle a signaling part of a service layer capability and provides an interface to application server 245. It may be a standalone entity or collocated with an MB-SMF.

The multicast/broadcast service user plane (MBSU) 240 handles a payload part of the service layer capability and may be a standalone entity or collocated with the MBSF or MB-UPF.

The SMF and UPF may be enhanced to support the multicast/broadcast service. The AMF may also be enhanced to make transparent the signaling for multicast/broadcast service between the RAN/UE and multicast/broadcast-SMF (MB-SMF) 225.

Figure 3:
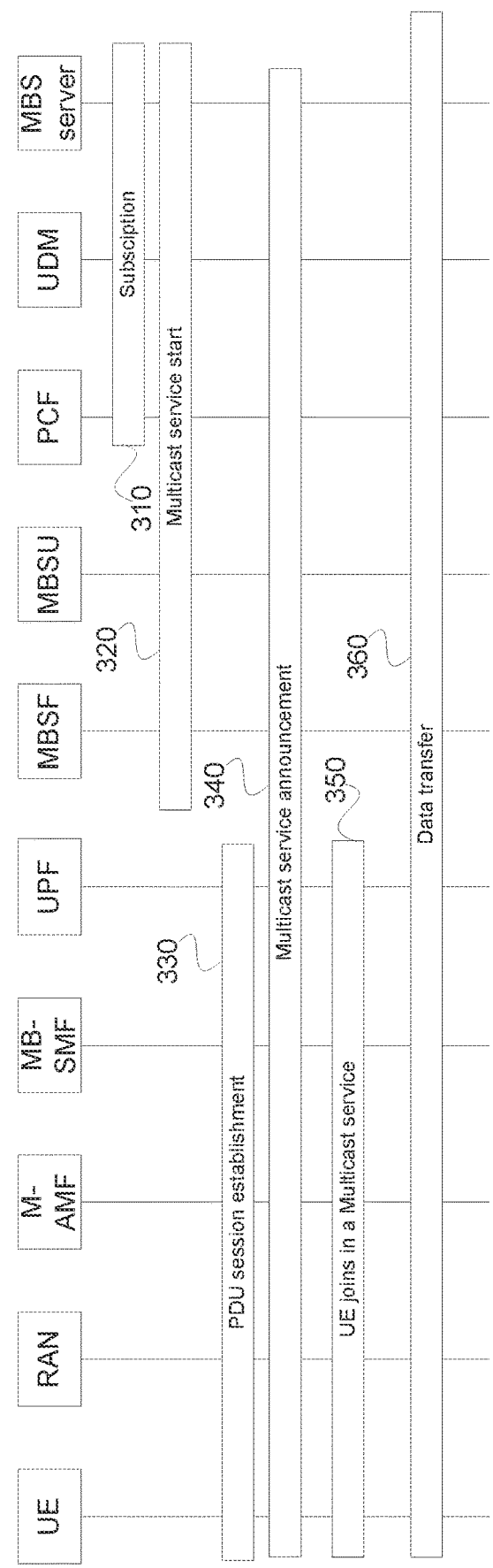
FIG. 3 depicts phases in a process for providing a multicast service, in accordance with some example embodiments.

FIG. 3 depicts examples of phases in a process for providing a multicast service.

At a service subscription phase 310, a subscription is the agreement of a user to receive service(s) offered by an operator. The relationship between the user and the service provider is established during the subscription. A relationship may be stored in the unified data repository (UDR) statically or pushed dynamically from the MBS server to the related PCF.

At a multicast service start phase 320, the MBS server triggers the MBSF to start the session to send multicast data. The MBSF triggers an MBS session establishment in 5GS. Session start occurs independently of activation of the service by the user (i.e., a given user may activate the service before or after session start). Session start is the trigger for bearer resource establishment for MBMS data transfer.

At a PDU session establishment phase 330, the UE may initiate a unicast PDU session establishment to retrieve a multicast service configuration or setup an association with the MBSF. This may occur before phase 310. The UE may subscribe to a multicast service dynamically via an established PDU session. This phase may also occur after phase 340 in a case where the multicast service starts before a UE joins the multicast service.

At a multicast service announcement phase 340, the multicast service announcement/discovery mechanisms allow users to request or to be informed of the range of available multicast services. The announcement is also used to distribute information to users about the services parameters required for service activation (e.g., IP multicast address(es)) and possibly other service-related parameters (e.g., service start time).

At a multicast joining phase 350, the UE initiates the joining process in order to become a member of a multicast group.

At data transfer phase 360, data is transferred to the UE.

Figure 4:
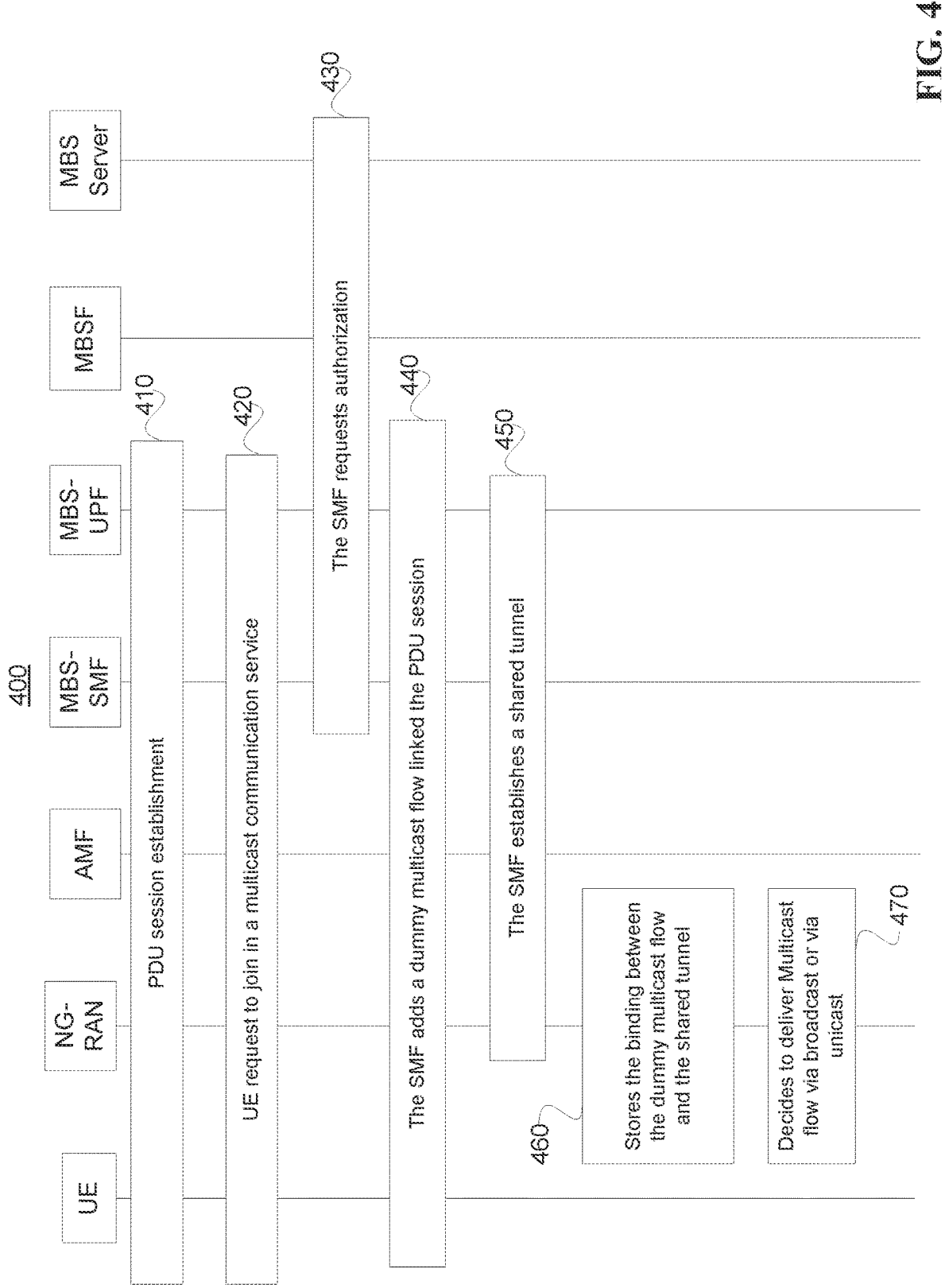
FIG. 4 depicts a process for establishing a shared tunnel to transfer a multicast service in a 5G system, in accordance with some example embodiments.

FIG. 4 depicts an example of a process for establishing a shared tunnel to transfer a multicast service in a 5G system. In some example embodiments, the process occurs after the UE has established a PDU session.

At 410, the UE initiates a unicast PDU session establishment process. During the process, an MBS-SMF supporting unicast and multicast is selected based on a specific DNN and single network slice selection assistance information (S-NSSAI). Upon completion of the establishment process, the UE may retrieve a multicast service configuration.

At 420, the UE initiates a joining request via UP data or NAS message to join a multicast communication service.

At 430, when the request is detected by the MB-SMF, the MB-SMF requests the MBSF to authorize the UE. The MBSF checks whether the UE is allowed to access the service. If it is, the MBSF checks whether a multicast context for the multicast group exists (i.e., whether a UE has already joined the multicast group). If the multicast context for the multicast group does not exist, then the SMF creates it when the first UE joins the multicast group. The check may involve the MBS server, PCF, and/or UDM. The MBS server may store the group membership in the UDM or send it to the PCF before the 430. Then the MBSF or MB-SMF may retrieve the information during the association establishment between the MBSF/MB-SMF and the PCF/UDM. If there is no interaction between the MBSF and the PCF/UDM, the MBSF may retrieve the information from the MB-SMF.

At 440, the MBSF triggers the MB-SMF to establish a dummy multicast flow into the unicast PDU session.

At 450, the MBSF triggers the MB-SMF to establish a shared tunnel for UEs that belong to the same multicast group under the same NG-RAN node. The dummy flow included in the unicast PDU session is not used to transfer the multicast service data. The multicast service data is transferred via the shared tunnel to the NG-RAN node. If there a shared tunnel for the same multicast service, (i.e. other UEs have joined the multicast group via the NG-RAN node before this process), 450 may be skipped.

At 460, the NG-RAN node is provided the information from 440 and/or 450 to bind the shared tunnel and dummy flow linked in the unicast PDU session. The information may include flow identifiers, and/or TMSI and/or session identifier.

At 470, when the NG-RAN node receives the multicast data, the NG-RAN may determine to deliver the multicast flow via a broadcast mode or a unicast mode. If the unicast mode is used, the dummy multicast flow is used for transferring the multicast flow on the radio interface.

When the UE moves to another RAN node, the service continuity of the unicast service may be performed during the handover process but providing service continuity of multicast services is challenging. This disclosure provides techniques to ensure the service continuity of a multicast service of a mobile UE.

Figure 5:
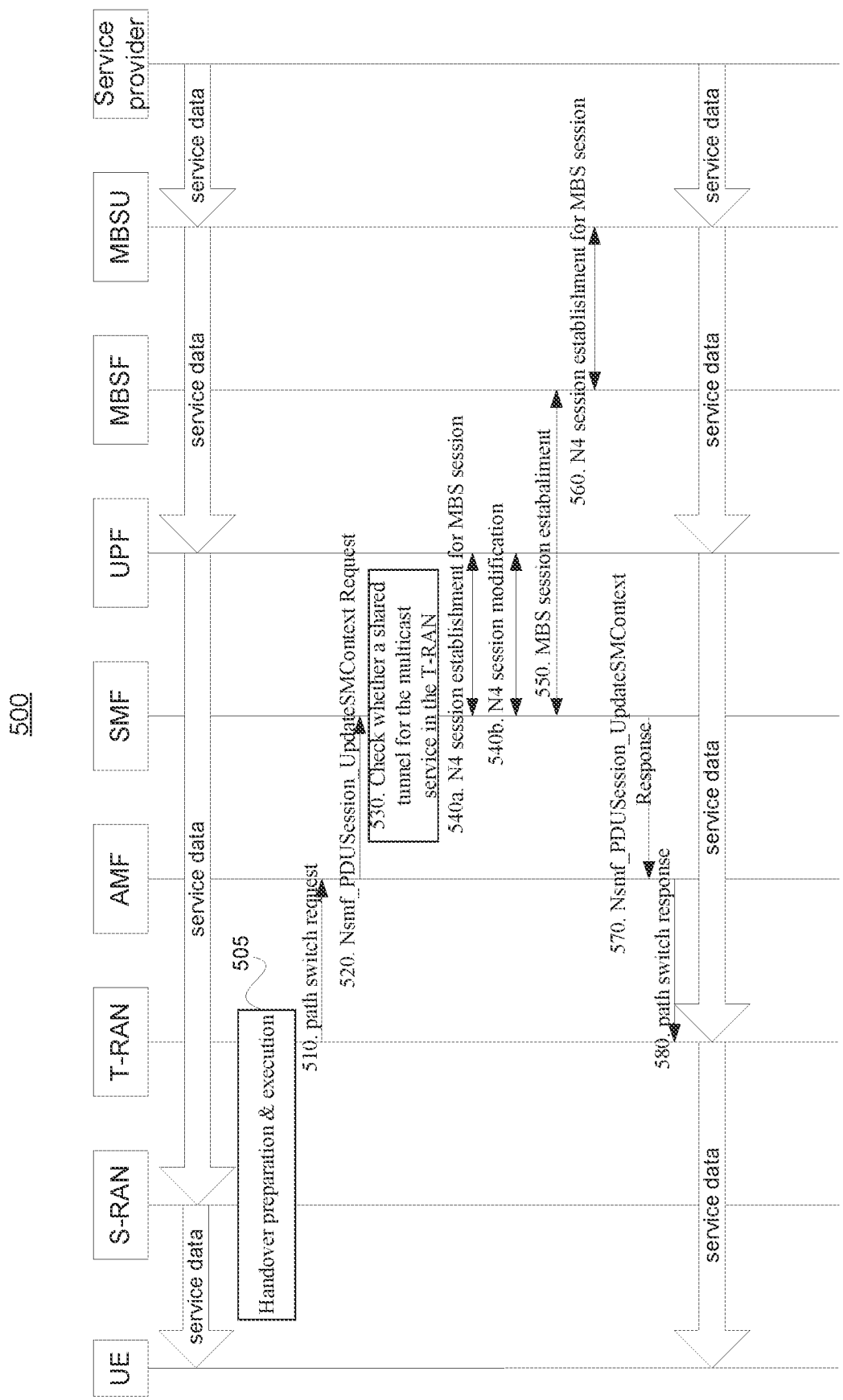
FIG. 5 depicts an Xn-based process for transferring a multicast/broadcast service, in accordance with some example embodiments.

FIG. 5 depicts an example of a Xn-based process for transferring a multicast/broadcast service. The foregoing description focuses on the handling of a multicast service.

At 505, the UE receives multicast service data from a source RAN (S-RAN). When the UE moves the edge of the S-RAN coverage, the S-RAN selects a target RAN (T-RAN) for transferring the UE including the multicast service. The S-RAN initiates a handover process and sends a handover request message to the T-RAN. The T-RAN performs admission control and reserves the resources based on the context from S-RAN. The context may also include an indication of multicast service. If the UE has multiple multicast services, the UE context transferred from the S-RAN to the T-RAN includes the MBS context, e.g. TMGI, MBS session identifier, MBS service flow identifier, or MBS service identifier. Based the MBS context, the T-RAN determines whether an MBS session for the same MBS service has already been established. If the MBS session for the same MBS service has been established, (e.g., the UE multicast service is joining at least one other UE that is already getting multicast service from the T-RAN), the T-RAN binds a shared tunnel for the MBS session and a dummy flow in a unicast PDU session. If the MBS session for the same MBS service has not already been established, (e.g. no other UE is getting multicast service from the T-RAN), the T-RAN may allocate an MBS DL shared tunnel for the MBS service. In order to avoid packet loss, the T-RAN may allocate the tunnel for data forwarding. For the MBS service, the dummy flow linked in the unicast PDU session which is related to the MBS session may be revoked in the T-RAN to transfer the forwarded data.

If the T-RAN can't establish shared tunnel for the MBS service, the T-RAN informs the S-RAN of the failure and a cause for the failure. The dummy flow linked in the unicast PDU session which is related to the MBS session may be indicated as a flow that is not accepted.

If the UE has multiple MBS services, the T-RAN may allocate multiple shared tunnels for each MBS service. The T-RAN can allocate one shared tunnel for multiple MBS services as indicated by the MBSF or the MB-SMF.

At 510, the T-RAN sends a N2 path switch request including a list of PDU sessions to be switched with N2 SM information, a list of PDU sessions that failed to be established with a failure cause given for each session in the N2 SM information element, and UE location information to the AMF. If the MBS DL session information is allocated for each MBS session in 505, one or more of the MBS DL sessions/flows related with MBS service identifier, MBS session identifier, or MBS service flow identifier, or TMGI are also included and transferred to MBS-SMF or further transferred to the MBSF.

If the T-RAN is not able to establish a shared tunnel for the MBS service, a list of accepted quality of service (QOS) flows should not include the dummy flow binding with the MBS service.

At 520, the context request from the AMF to SMF (e.g., Nsmf_PDUSession_UpdateSMContext Request) includes one or more of N2 SM information received from the T-RAN in 510 and N2 SM information from the source NG-RAN (secondary RAT usage data), UE location information, and UE presence in LADN service area. The AMF sends N2 SM information by invoking a request service operation (e.g., Nsmf_PDUSession_UpdateSMContext) for each PDU session in the lists of PDU sessions received in the N2 Path switch request. If the MBS DL session information is allocated in 510, the AMF transfers the MBS DL session information to the MB-SMF. If multiple MBS sessions are involved, the AMF transfers the MBS DL session information to the MB-SMFs for each MBS session in the list of MBS sessions received in the N2 path switch request.

At 530-540, if the MBS DL session information is included in the request, the SMF determines whether the UE is authorized to receive the MBS service. If the UE is authorized to receive the MBS service identified by one or more of an MBS service ID, an MBS session ID, or TMGI, the SMF further determines whether the shared tunnel for the MBS service is established in the UPF. If the shared tunnel is established in the UPF, the SMF informs the UPF of the updated MBS DL information in the T-RAN via a N4 session modification. If the SMF determines to allocate a new shared tunnel to transfer the MBS service, the SMF sends an N4 session establishment request to the UPF. The parameters of an MBS session include the MBS service identifier, MBS session identifier, and/or TMGI.

If shared tunnel information is updated at 530-540, the SMF informs the MBSF at 550 and the MBSF updates the information at the MBSU at 560.

At 570, the SMF sends a context response (e.g., Nsmf_PDUSession_UpdateSMContext response) to the AMF for PDU sessions that have been transferred successfully.

At 580, once the responses (e.g., Nsmf_PDUSession_UpdateSMContext response) are received from all the SMFs, the AMF aggregates the received core network (CN) tunnel info and sends the aggregated information as a part of N2 SM information along with the failed PDU sessions in an N2 path switch request acknowledgement (Ack) to the T-RAN.

In some cases, an intermediate SMF (I-SMF) and/or intermediate user plane function (I-UPF) may be included in the handover process. The I-SMF and/or I-UPF may be inserted, changed or removed during the handover process. For example, an existing or new I-SMF and/or I-UPF may be involved with the establishment or update of the MBS shared tunnel. The shared tunnel information may be exchanged between the T-RAN and I-UPF, I-UPF and UPF, and/or UPF and MBSF.

If the MBSF is co-located with MB-SMF, the signaling between the MB-SMF and MBSF is internal to the co-located MBSF and MB-SMF equipment.

Figure 6:
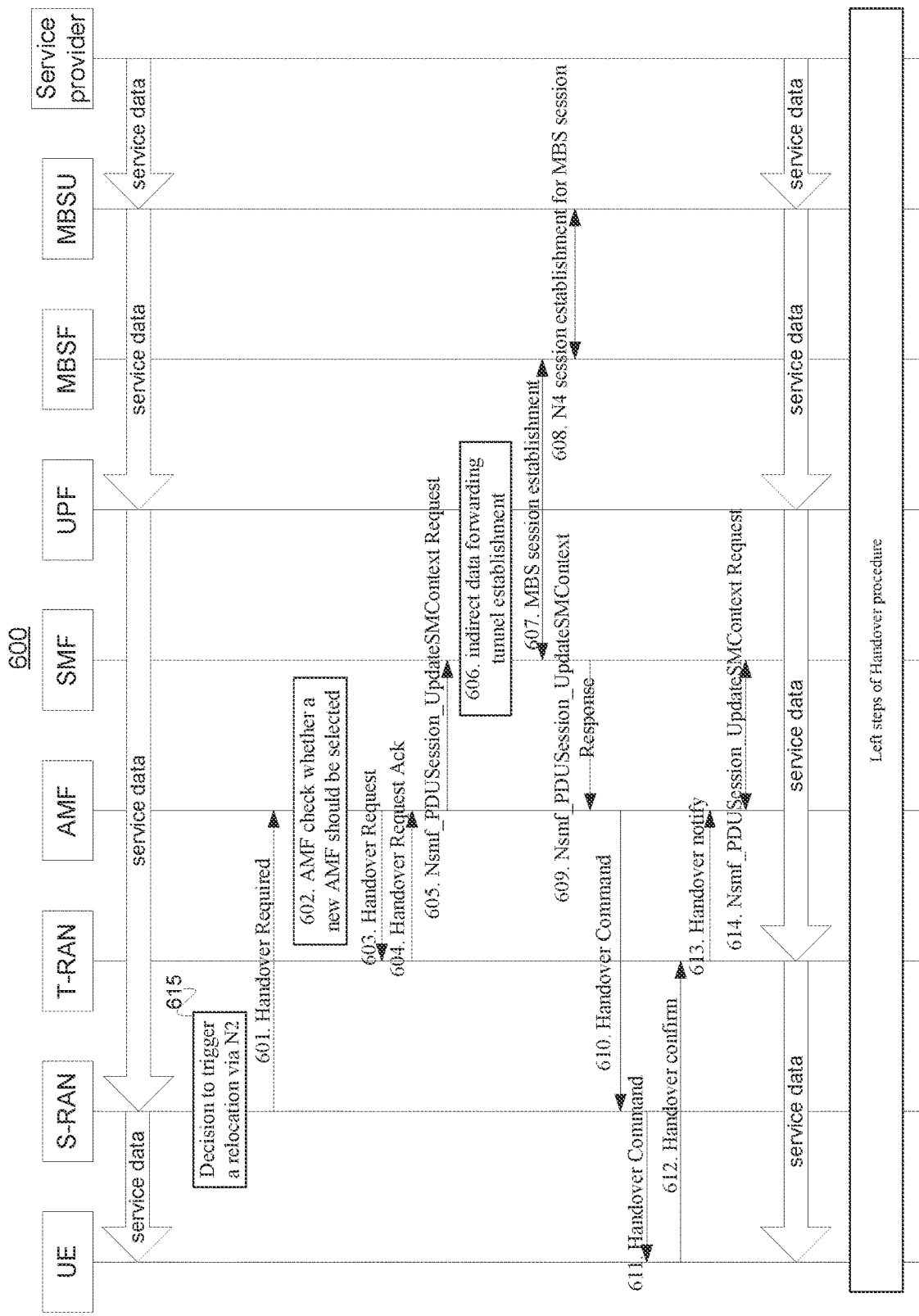
FIG. 6 depicts an N2-based process for transferring a multicast/broadcast service, in accordance with some example embodiments.

FIG. 6 depicts an example of a N2 based process for transferring a multicast/broadcast service. The foregoing description details the handling of broadcast and multicast services.

At 615, the UE receives multicast service data from an S-RAN. When the UE moves to the edge of the S-RAN coverage, the S-RAN selects a T-RAN for transferring the UE including the multicast service. The S-RAN initiates a handover process.

At 601, the S-RAN sends to the AMF a handover required message including a target identifier, a source to target transparent container, an SM N2 information list, PDU Session identifiers, and an intra-system handover indication. The source to target transparent container includes NG-RAN information created by the S-RAN to be used by T-RAN which is transparent to the 5G core (5GC). The source to target transparent container further includes corresponding user plane security enforcement information, QoS flows/DRBs information subject to data forwarding for each PDU session.

PDU sessions handled by the S-RAN (i.e. all existing PDU sessions with active UP connections) are included in the handover required message, indicating which of the PDU session(s) are requested by the S-RAN to handover. The SM N2 info includes direct forwarding path availability if direct data forwarding is available. Direct forwarding path availability indicates whether direct forwarding is available from the S-RAN to the T-RAN. This indication from the S-RAN can be based on, for example, the presence of IP connectivity and security association(s) between the S-RAN and the T-RAN.

The context may also include an indication of multicast service. If the UE has multiple multicast services, the UE context transferred from the S-RAN to the T-RAN includes the MBS context such as a TMGI, an MBS session identifier, an MBS flow identity, or an MBS service identifier. Based the MBS context, the T-RAN checks whether an MBS session for the same MBS service has been established or not.

At 602, when the S-AMF cannot serve the UE anymore, the S-AMF selects a target AMF (T-AMF). When a T-AMF is selected, S-AMF sends a handover message such as a Namf_Communication_CreateUEContext Request message including N2 information such as a target identifier, a source to target transparent container, an SM N2 information list, PDU session identifiers, and/or UE context information to the T-AMF. For each PDU session indicated by the S-RAN, the T-AMF invokes a request such as an Nsmf_PDUSession_UpdateSMContext Request to the associated SMF. The SMF based on the target identifier, checks if an N2 handover for the indicated PDU session can be accepted. The SMF also checks the UPF selection criteria. If the SMF selects a new intermediate UPF, the SMF sends an N4 session modification request to the PSA and then sends an N4 session establishment request to the T-UPF upon reception of response from the PSA. The SMF sends an Nsmf_PDUSession_UpdateSMContext response message including a PDU Session identifier, an N2 SM information, and/or a reason for non-acceptance to the T-AMF.

At 603, if T-AMF is selected, 603 and 609 are performed by T-AMF. Otherwise the 603 and 609 are is performed by the S-AMF.

The AMF determines the T-RAN based on a target identifier. It sends a handover request message including a source to target transparent container, N2 MM information, an N2 SM information list, tracing requirements, and/or a UE radio capability identifier to the T-RAN. The source to target transparent container is forwarded as received from S-RAN to the T-RAN. The N2 MM information includes for example, security information and a mobility restriction list if available in the AMF.

If the contexts included in the source to target transparent container include an indication of multicast service, the T-RAN checks whether an MBS session for the same MBS service has been established or not based on the TMGI, MBS session identifier, MBS flow identifier, or MBS service identifier.

If the MBS session for the same MBS service has been established, (e.g. the UE is joining a group that is already being served the multicast service via T-RAN), the T-RAN binds a shared tunnel for the MBS session and flow (sometimes referred to as a dummy flow) linked in the unicast PDU session. If the MBS session for the MBS service hasn't been established, (e.g. no users being served by the T-RAN are served the same multicast service by the T-RAN), the T-RAN allocates an MBS DL shared tunnel for the MBS service.

In order to avoid packet loss and support direct data forwarding, the T-RAN may allocate a tunnel for data forwarding. For an MBS service, the flow (dummy) linked in the unicast PDU session which is related with the MBS session may be revoked at the T-RAN to transfer the forwarded data.

If the T-RAN cannot establish a shared tunnel for the MBS service, the T-RAN informs the S-RAN of a proper failure cause in the target to source transparent container.

If the UE has multiple MBS services, T-RAN may allocate multiple shared tunnels for the MBS services separately.

At 604, the T-RAN sends a handover request acknowledge to the AMF including one or more of a target to source transparent container, a list of PDU sessions to hand-over with N2 SM information, a list of PDU sessions that failed to be established with a failure cause given in the N2 SM information element. The N2 SM information in the list of PDU sessions to handover, contains for each PDU session identifier, T-RAN N3 addressing information such as an N3 UP address and a tunnel identifier of the T-RAN for the PDU session.

If the MBS DL session information is allocated for each MBS session in 603, the MBS DL session related with the MBS service identifier or the MBS session identifier or the TMGI is also included and transferred to the MBS-SMF or further transferred to the MBSF.

If the T-RAN cannot establish a shared tunnel for the MBS service, the list of accepted QoS Flows should not include the flow (dummy) binding with the MBS service.

At 605, the AMF sends a context request to the SMF such as a Nsmf_PDUSession_UpdateSMContext Request message including one or more of a PDU session identifier, an N2 SM response received from the T-RAN in 604. For each N2 SM response received from the T-RAN including one or more of N2 SM information included in a handover request acknowledgement, the AMF sends a received N2 SM response to the SMF indicated by the respective PDU session identifier.

If no new T-UPF is selected, the SMF stores the N3 tunnel information of the T-RAN from the N2 SM response message if the N2 handover is accepted by the T-RAN.

At 606, the SMF/UPF allocates the N3 UP address and tunnel identifiers for indirect data forwarding corresponding to the data forwarding tunnel endpoints established by T-RAN.

At 607-608, if the MBS DL session information is included, the SMF checks whether the UE is authorized to receive the MBS service. If the UE is authorized to receive the MBS service identified by the MBS service identifier or MBS session identifier or the TMGI, the SMF checks whether the shared tunnel for the MBS service is established in the UPF. If the shared tunnel is established in the UPF, the SMF informs the UPF of the updated MBS DL information in the T-RAN via N4 session modification. If the SMF determines to allocate a new shared tunnel to transfer the MBS service, the SMF sends N4 session establishment request to the UPF. The parameters of the MBS session, e.g. the MBS service identifier or the MBS session identifier or the TMGI.

If shared tunnel information is updated, the SMF informs the MBSF and the MBSF updates the information at the MBSU.

The foregoing steps at 607-608 can be executed after step 614. The SMF only stores the received MBS DL session information here.

At 609, the SMF sends to the AMF a context response message such as a Nsmf_PDUSession_UpdateSMContext Response which may include N2 SM Information. In the case of indirect data forwarding, the DL forwarding tunnel information is contained in an N2 SM information.

In the case of an AMF change, the T-AMF sends a context response message to S—the AMF such as a Namf_Communication_CreateUEContext Response message including one or more of N2 information necessary for S-AMF to send a handover command to the S-RAN including a target to source transparent container, a PDU sessions failed to be setup list, an N2 SM information including N3 DL forwarding Information, and/or PCF ID. The target to source transport container is received from the T-RAN. The N2 SM Information is received from the SMF.

At 610, the AMF sends to S-RAN a handover command including one or more of a target to source transparent container, a list of PDU sessions to be handed-over with N2 SM information containing information received from the T-RAN during the handover preparation phase, a list of PDU sessions failed to be setup.

The target to source transparent container is forwarded as received from S-AMF. The SM forwarding info list includes T-RAN SM N3 forwarding info list for direct forwarding or S-UPF SM N3 forwarding info list for indirect data forwarding.

At 611, the S-RAN sends a handover command message (UE container) to the UE.

At 612, the UE sends a handover confirm message to the T-RAN. After the UE has successfully synchronized to the target cell, the UE sends a handover confirm message to the T-RAN. This message indicates that the handover is successful at the UE.

At 613, the T-RAN sends a handover notify to message to the (T-)AMF. This message indicates that the handover is successful at the T-RAN.

At 614, the T-AMF sends to the SMF a context request message such as a Nsmf_PDUSession_UpdateSMContext Request including one or more of a handover complete indication for a PDU session identifier, UE presence in LADN service area, and/or N2 SM information including secondary RAT usage data.

If 607-608 are not executed, the SMF performs operation to MBSF with the MBS DL information stored in 606.

If the UE has multiple MBS services, more than one SMF may interact with MBSF separately.

If the 607-608 are executed, downlink packets for the MBS service are sent from MBSU to S-RAN via the UPF after 613, otherwise, downlink packets for MBS service are sent from the MBSU to the S-RAN via the UPF after the shared tunnel is established or updated.

Additional handover processes may also be executed.

In some case, an I-SMF may be inserted, changed or removed during the handover process. In that case, the (existing or new) I-SMF and I-UPF are involved with establishing or updating the MBS shared tunnel. The shared tunnel information may be exchanged between the T-RAN and I-UPF, I-UPF and UPF, UPF and MBSF.

FIG. 7 depicts an example of a process 700 for wireless communication, in accordance with some example embodiments. At 710, the method 700 includes, receiving, by a target radio access node (T-RAN) from a source radio access node (S-RAN) or from an access and mobility management function (AMF), a handover request including a multicast or broadcast context for a handover of a multicast and broadcast service (MBS) to the T-RAN. At 720, the method includes binding a shared tunnel for the MBS and a flow in a unicast protocol data unit (PDU) session in a case that an MBS session identified in the multicast or broadcast context has already been established at the T-RAN. At 730, the method includes sending, to an AMF, a message comprising a handover request acknowledgment or a path switch.

FIG. 8 shows another example of a process 800 for wireless communication, in accordance with some example embodiments. At 810, the method 800 includes, receiving, by a target radio access node (T-RAN) from a source radio access node (S-RAN) or from an access and mobility management function (AMF), a handover request including a multicast or broadcast context for the handover of a multicast and broadcast service (MBS) to the T-RAN. At 820, the method includes checking an establishment of the MBS at the T-RAN, wherein in a case that the MBS has not been established, allocating, by the T-RAN, the shared tunnel for the MBS, and in another case that the MBS has already been established at the T-RAN, binding a shared tunnel for the MBS and a flow in a unicast protocol data unit (PDU) session.

Figure 9:
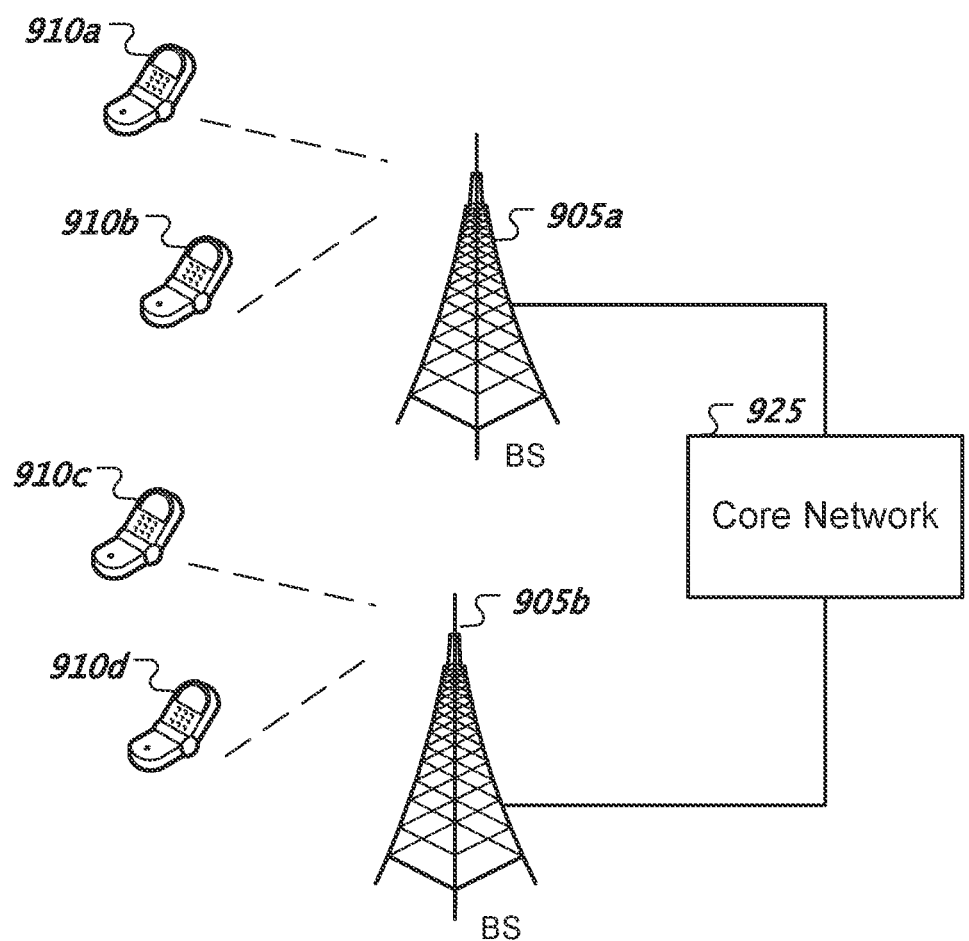
FIG. 9 depicts a wireless communication system, in accordance with some example embodiments.

FIG. 9 shows an example of a wireless communication system 900 where techniques in accordance with one or more embodiments of the present technology can be applied. A wireless communication system 900 can include one or more base stations (BSs) 905a, 905b, one or more wireless devices 910a, 910b, 910c, 910d, and a core network 925. A base station 905a, 905b can provide wireless service to wireless devices 910a, 910b, 910c and 910d in one or more wireless sectors. In some implementations, a base station 905a, 905b includes directional antennas to produce two or more directional beams to provide wireless coverage in different sectors.

The core network 925 can communicate with one or more base stations 905a, 905b. The core network 925 provides connectivity with other wireless communication systems and wired communication systems. The core network may include one or more service subscription databases to store information related to the subscribed wireless devices 910a, 910b, 910c, and 910d. A first base station 905a can provide wireless service based on a first radio access technology, whereas a second base station 905b can provide wireless service based on a second radio access technology. The base stations 905a and 905b may be co-located or may be separately installed in the field according to the deployment scenario. The wireless devices 910a, 910b, 910c, and 910d can support multiple different radio access technologies. The techniques and embodiments described in the present document may be implemented by the base stations of wireless devices described in the present document.

Figure 10:
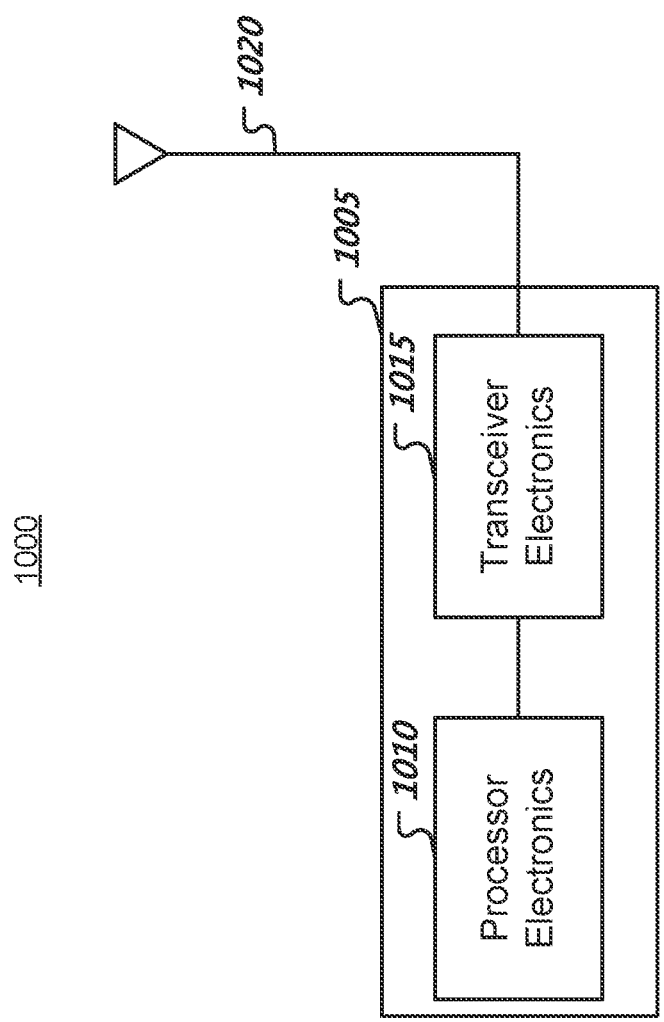
FIG. 10 depicts a block diagram of a portion of a radio system, in accordance with some example embodiments.

FIG. 10 is a block diagram representation of a portion of a radio station in accordance with one or more embodiments of the present technology can be applied. A radio 1005 such as a base station or a wireless device (or UE) can include processor electronics 1010 such as a microprocessor that implements one or more of the wireless techniques presented in this document. The radio 1005 can include transceiver electronics 1015 to send and/or receive wireless signals over one or more communication interfaces such as antenna 1020. The radio 1005 can include other communication interfaces for transmitting and receiving data. Radio 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the radio 1005. In some embodiments, the radio 1005 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
   receiving, by a target radio access node (T-RAN) from a source radio access node (S-RAN) or from an access and mobility management function (AMF), a handover request including a multicast or broadcast context for a handover of a multicast and broadcast service (MBS) to the T-RAN;
   determining, by the T-RAN, whether an MBS session identified in the multicast or broadcast context has already been established;
   binding a shared tunnel for the MBS and a flow in a unicast protocol data unit (PDU) session to transmit multicast service data through the shared tunnel in a case that the MBS session identified in the multicast or broadcast context has already been established at the T-RAN; or establishing a shared tunnel for the MBS session in a case that the MBS session identified in the multicast or broadcast context has not been established at the T-RAN; and sending, to the AMF, a message comprising a handover request acknowledgment in response to receiving the handover request from the S-RAN or a message comprising a path switch request in response to receiving the handover request from the AMF.

2. The wireless communication method of claim 1, wherein the message further comprises an indication that indicates a successful transfer and the shared tunnel has already been established at the T-RAN, the multicast or broadcast context is not included in the message.

3. The wireless communication method of claim 1, wherein the message further comprises an indication that indicates a successful transfer and the shared tunnel has not already been established at the T-RAN, the multicast or broadcast context is included in the message.

4. The wireless communication method of claim 1, wherein in a case that an indication indicates a failed transfer, a failure flow list and a cause is included in the message.

5. The wireless communication method of claim 1, wherein the multicast or broadcast context for a multicast or broadcast downlink flow includes an MBS identifier or a multicast or broadcast flow identifier or a temporary mobile group identity (TMGI), and wherein the multicast or broadcast context corresponds to one or more multicast or broadcast downlink flows associated with an MBS session including the multicast or broadcast downlink flow.

6. The wireless communication method of claim 1, wherein the T-RAN allocates a tunnel for data forwarding.

7. The wireless communication method of claim 6, wherein the S-RAN forwards buffered multicast or broadcast downlink data by using a 5QI of the flow in the unicast PDU session.

8. The wireless communication method of claim 1, wherein the multicast or broadcast context is included in a source to target container.

9. The wireless communication method of claim 1, further comprising:
receiving, at the T-RAN from a UE, a handover confirmation; and
sending, to a target AMF a handover completion message.

10. A wireless communication method, comprising:
receiving, by a target radio access node (T-RAN) from a source radio access node (S-RAN) or from an access and mobility management function (AMF), a handover request including a multicast or broadcast context for the handover of a multicast and broadcast service (MBS) to the T-RAN;
checking an establishment of the MBS at the T-RAN
in a case that the MBS has not been established, allocating, by the T-RAN, a shared tunnel for the MBS; or
in another case that the MBS has already been established at the T-RAN, binding the shared tunnel for the MBS and a flow in a unicast protocol data unit (PDU) session,
wherein in a case that the shared tunnel for the MBS is not established by a target radio access network, a quality of service flow accepted list does not include an identity of the flow binding with the MBS.

11. The wireless communication method of claim 10, wherein the multicast or broadcast context for a multicast or broadcast downlink flow includes an MBS identifier or a multicast or broadcast flow identifier or a temporary mobile group identity (TMGI), and wherein the multicast or broadcast context corresponds to one or more multicast or broadcast downlink flows associated with an MBS session including the multicast or broadcast downlink flow.

12. The wireless communication method of claim 10, wherein in the case that the MBS has not been established by the target radio access node, a quality-of-service flow accepted list does not include an identity of the flow binding with the MBS.

13. An apparatus, comprising:
at least one processor; and
a memory including executable instructions that when executed by the at least one processor cause the apparatus to perform operations comprising:
receiving, by a target radio access node (T-RAN) from a source radio access node (S-RAN) or from an access and mobility management function (AMF), a handover request including a multicast or broadcast context for a handover of a multicast and broadcast service (MBS) to the T-RAN;
determining, by the T-RAN, whether an MBS session identified in the multicast or broadcast context has already been established;
binding a shared tunnel for the MBS and a flow in a unicast protocol data unit (PDU) session to transmit multicast service data through the shared tunnel in a case that the MBS session identified in the multicast or broadcast context has already been established at the T-RAN; or
establishing a shared tunnel for the MBS session in a case that the MBS session identified in the multicast or broadcast context has not been established at the T-RAN; and
sending, to the AMF, a message comprising a handover request acknowledgment in response to receiving the handover request from the S-RAN or a message comprising a path switch request in response to receiving the handover request from the AMF.

14. The apparatus of claim 13, wherein the message further comprises an indication that indicates a successful transfer and the shared tunnel has already been established at the T-RAN, the multicast or broadcast context is not included in the message.

15. The apparatus of claim 13, wherein in the message further comprises an indication that indicates a successful transfer and the shared tunnel has not already been established at the T-RAN, the multicast or broadcast context is included in the message.

16. The apparatus of claim 13, wherein in a case that an indication indicates a failed transfer, a failure flow list and a cause is included in the message.

17. The apparatus of claim 13, wherein the multicast or broadcast context for a multicast or broadcast downlink flow includes an MBS identifier or a multicast or broadcast flow identifier or a temporary mobile group identity (TMGI), and wherein the multicast or broadcast context corresponds to one or more multicast or broadcast downlink flows associated with an MBS session including the multicast or broadcast downlink flow.

18. The apparatus of claim 13, wherein the T-RAN determines to establish the shared tunnel for an MBS session in a case that the MBS session identified in the multicast or broadcast context has not been established at the T-RAN.

\* \* \* \* \*